3,385,705
PHOTO-SENSITIVE MATERIAL HAVING A SHALLOW LAYER CONTAINING A BENZENEDIAZO SULFONIC ACID COMPOUND OR SALTS THEREOF
Cornelis Johannes Dippel, Harke Jan Houtman, and Hendrik Jonker, Eindhoven, Netherlands, assignors to North American Philips Company, Inc., New York, N.Y., a corporation of Delaware
No Drawing. Filed Sept. 25, 1964, Ser. No. 399,326
Claims priority, application Netherlands, Oct. 9, 1963, 299,034
4 Claims. (Cl. 96—75)

ABSTRACT OF THE DISCLOSURE

Photosensitive material producing a minimum of image distortions. The material consists of a hydrophobic base with a thin hydrophilic layer of a thickness of at most $2\mu$ and containing a concentration of a light-sensitive benzenediazonium compound such that the extinction per $\mu$ is at least 0.2 at a wavelength of 3655 A.

---

The invention relates to photo-sensitive material in the form of a support having a hydrophilic layer containing a photo-sensitive compound which provides, upon exposure, a light reaction product, which, in the presence of moisture, is capable, by disproportioning of releasing metallic mercury in the form of a latent mercury image from a mercurous compound to be introduced after the exposure, which image can be intensified by physical development to form a metal image.

In the electronic industry and many other industries, photographic reproduction is frequently employed in order to produce patterns having a high degree of accuracy both with respect to the conformity and sharpness of lines and to the deposition of the original image. This need for accuracy has become even greater and more demanding in the acceleration towards miniaturization and automation in the electronics industry.

The final negative employed in the manufacturing process is usually obtained by a series of photographic negative and positive copying processes from a master negative made from the original drawing or print of the model. When the copying is carried out repeatedly on the same material the processes are termed "generations," the use of four or six generations not being unusual.

In the industrial electronics field it is necessary that in the final negative the dark portions have a high density while the bright portions have a high transparency. Because of this need for a high density, for example $D=2$, the risk of line spread is increased and thus the negative and resist that is made from the negative are distorted reproductions of the original.

The situation of the photographic reproduction for miniaturization in industrial electronics is seriously aggravated by the optical difficulties of making photographic reductions of a starting negative. The light diffraction theory shows that a great resolving power can be obtained only by means of definite lenses and of a prescribed relative aperture ($=d/f$, wherein $D$=effective diameter and $f$=focal distance of the lens), provided the resolving power of the photographic material allows registration thereof. The smallest perceptible detail $(\Delta y)_{min}=\lambda/2A$, wherein $\lambda$ is the wavelength of the light used and $A$ is the numerical aperture of the lens=$d/2f$, i.e. half of the relative aperture. Recalculated in the maximum attainable number of lines per mm., this means that $$n_{max}=\frac{1000}{\Delta Y_{min}}=\frac{2000}{\lambda}\times A$$

Thus lenses must be chosen, which have the maximum aperture matching the $\lambda$ employed and the reproduction of the desired minimum detail $\Delta y$. However, it is known that a high aperture required for the reproduction of small details involves an extremely small focal depth, which is inversely proportional to the square of the aperture. For example with a numerical aperture of 0.6 and a value $\lambda$ of $0.365\mu$ there is available only a focal depth of less than $1\mu$. Any erroneous focusing, however, suppresses the possibility of obtaining the desired detail in the reproduction. Particularly, if the same piece of photographic material has to be focused on the same apparatus, repeatedly automatically with equal precision, the aforesaid requirement of the numerical aperture and the focal depth involved gives rise to serious difficulties.

The difficulties described above are the more pronounced if the use of high reductions in industry is not restricted to the reproduction of a black-white object with only one contrast, which is mostly the case in electronics, where only one point of the characteristic curve is utilized, i.e., that for attaining the desired high density-value whereas all further exposure values are carefully held below the threshold value. For the reproduction of drawings with all kinds of pencil lines and ink lines and for the reproduction of photographs or films with continuous half tones, the whole density curve is required and the conditions of reproduction must be observed for each point of the negative and positive curves. Moreover, the resolving power is usually intimately dependent upon the exposure and hence upon density and especially in the case of low amounts of blackening a strongly reduced resolving power will frequently be found even in the best emulsions. Finally, with an accurate fidelity reproduction of the plurality of brightness values of the object to be reproduced there is an additional, special $\gamma$-condition (slope of the characteristic curve $AD/\Delta \log E$), i.e.: $\gamma$ negatixe$\times\gamma$ positive=1, so that the full emphasis falls on characteristic curves having a value $\gamma=1$ or approximately 1, in contradistinction to which the reproduction of only one contrast is often more readily obtainable with a higher $\gamma$, which is conducive to the definition as is known. Especially in those cases in which the optical difficulties referred to above with the strongly reduced reproduction of continuous half tones continue to exist, a limit is reached with the reduction of drawings and photographs much sooner than in the reduction of objects having only one contrast. With the reduced reproduction of working drawings practically possible for example the film had to be chosen with a width of 70 mm., although a 35 mm. film has repeatedly been aimed at, though if the conformity with respect to dimensions and brightness values had to be guaranteed.

There is a known photographic system wherein photosensitive compounds are employed which produce light reaction products capable of producing free mercury by disproportioning from mercury compounds in the presence of water to produce a latent image of mercury nuclei in the exposed regions. The latent image is then intensified by physical development. This system called the nucleus introduction system has a high resolving power, about 1000 lines/mm.

In this system the required thickness of the hydrophilic layer of the film has usually been chosen to be about $6\mu$ since at this value it has been considered that the maximum amount of photo-sensitive substance could be absorbed without appreciably decreasing the transparency of the layer. While in this system there is an absence of distortion due to light stray or light diffusion there is distortion caused by diffusion of the light reaction product when the exposed film is exposed to the mercuric compound in the presence of moisture.

A principal object of this invention is to provide a means for photographic reproduction by the nucleus introduction system whereby the problem of image distortion is practically eliminated.

This and other objects will be apparent from the description that follows.

In the instant invention there is employed a support having a hydrophilic layer containing a photosensitive compound which provides upon exposure a light-reaction product which, in the presence of moisture, is capable of releasing free mercury from a mercurous compound to form a latent mercury metal image which image is subsequently physically developed. It has been found quite unexpectedly, that according to the invention, that the image distortion caused by the employment of such a system can be practically eliminated by the use of a support having a hydrophilic layer of at least $0.5\mu$ and at most $2\mu$ and contains such a high concentration of the photo-sensitive compound that the extinction per $\mu$ is at least 0.2 at a wavelength of 3655 A.

It was found that by the use of the light sensitive material of the invention in this way a series of important improvements could be obtained. When making negatives with very small details, wherein prior to the formation of the final negative repeated copying in successive generations was required, it was found that an extensive test series yielded unacceptable results on the $6\mu$ layer used by the known method, whereas by using the material according to the invention having a thickness of the layer of $2\mu$ the requirements with respect to line sharpness and density could be readily satisfied. With other uses in which the pattern to be reproduced had to be provided subsequently with a metal deposited by electroplating, so that the photographically obtained pattern had to be developed into an electrically conductive image, in which case extraordinarily high density-values are required, it was found that by using a $2\mu$ layer a very satisfactory result was obtained with a very small image spread, whereas the result on a $6\mu$ layer was quite unacceptable.

It has furthermore been found that the use of the thin film of the invention allows the copying by means of the light of a mercury vapor discharge lamp without the use of a Wood's filter, while the light between 3000 and 5000 A. can be completely utilized without incurring loss of resolving power, whereas in the case of a $6\mu$ film the use of a Wood's filter ($\gamma=3655$ A.) is required in order to reproduce the same fine detail. The use of a Wood's filter, however, materially reduces the effective sensitivity of the layer, so that for practical use in industry the omission thereof is extremely advantageous.

The optical reproductions on the material according to the invention involve a wider choice of lenses and the numerical aperture and facilitate repeated, automatic focusing.

Optically reduced reproductions with the normally employed layer yield a poorer result expressed in lines/mm. than in the case of contact copying on the same material. With the thin photo-sensitive layer of the invention, however, substantially the same degree of detail reproduction can be attained with optical copying and contact copying.

In a preferred embodiment of the invention considerable additional improvements are obtained when the thin hydrophilic layer has an extinction per $\mu$ of at least 0.4. It has been found that in this case the curve of the resolving power plotted against log It with $\gamma=1$ rises extremely sharply near the ordinate to high values, while it remains constant at the peak value. With a $6\mu$ having the same value of extinction per $\mu$ of 0.4 said curve rises with a fairly slight slope to the peak value. In practice this means that even with very low density values the thin hydrophilic layer has already a fairly high resolving power, whereas with the same density values this magnitude is considerably lower for the thick layer. Materials having a photo-sensitive layer of a thickness of $1\mu$ to $1.5\mu$ and an extinction per $\mu$ of at least 0.5 are therefore extremely suitable for the strongly reduced reproductions of objects having continuous half tones such as working drawings, photographic negatives and television recording images. The total of the curve indicating the resolving power as a function of blackening with $\gamma=1$ which is, in fact, a measure for the range of use with the reproduction of small details, is considerably greater with these novel materials of the invention.

It should be noted that this curve indicates the attainable limits in an extremely unfavorable manner, since with $\gamma=1$ the image spread is much greater than for example with $\gamma=8$, so that the resolving power is proportionally smaller. If a higher $\gamma$ is employed, the resolving power increases proportionally so that for the reproduction of a single high black-white contrast these materials can yield particularly satisfactory results. The materials having the thickness of the photo-sensitive layer according to the invention and an extinction per $\mu$ of at least 0.5 have, in addition, the advantage that they have very good characteristic curves with fairly long straight portions. These materials are therefore extremely suitable for the optically reduced reproductions of continuous half tones, since in this case a high resolving power both for low and for high density values is attended with a straight characteristic curve with low $\gamma$ values. Consequently, these materials are very suitable for contact copying of aerial photographs in many generations. In general, it can be said that all materials according to the invention have better characteristic curves, especially with lower $\gamma$ values than the known $6\mu$ layers.

In general it is desirable to choose the most soluble salts of the photo-sensitive chemical compounds, in order to accumulate a maximum quantity of photo-sensitive substance in the thin hydrophilic layer. If desired, use may be made of additions raising the solubility, provided they do not have a disproportioning effect. As an alternative, there may be employed salts having a strong swelling effect on cellulose, or a treatment with formaldehyde-$CaCl_2HCl$ solutions, in order to cause the thin hydrophilic layer to swell prior to being impregnated with the photo-sensitive substance.

It will be obvious that hydrophilic layers according to the invention can be manufactured more readily than $6\mu$ layers. All processes required to obtain the hydrophilic layer of this invention have a more or less proportionally shorter duration.

Supports being hydrophilic by nature, for example cellophane, will, in general, not be chosen, since they can be made in this small thickness only with great difficulty. Cellulose-acetobutyrate lacquers and the like may be employed economically, since only a thin lacquer layer is required.

A further advantage of the invention lies in the fact that the fairly expensive photo-sensitive compounds are required only in smaller quantities. Thus a $6\mu$ layer with a swelling value of for example 120 $mm.^3.H_2O$ with a surface of 100 $cm.^2$, sensitized to an extinction value per $\mu$ of 0.5, requires six times the quantity of photo-sensitive substance of a $1\mu$ layer having the same relative swelling value. In general, it may be said that materials according to the invention can be manufactured considerably cheaper and in a simpler manner both for the reduced reproduction of a single black-white contrast and for reduced reproduction of continuous half tones, than materials having corresponding properties such as those obtained from highly dispersed, unstable AgBr-Lippmann emulsions. It will furthermore be evident that all advantages according to the invention also apply to colored images obtained in a known manner by physical color development.

As stated above, the desired high extinction value is attained by causing the hydrophilic layer to absorb a sufficient quantity of photo-sensitive substance. This means that the salts of the photo-sensitive compounds chosen must have a satisfactory solubility. If a minimum value of the extinction per $\mu$ has to be attained, the photo-sensitive compound must meet the requirement: $\epsilon \times c \geq 0.3 \times 10^3$, wherein $\epsilon$ is the equivalent extinction coefficient for $\gamma = 3655$ A. and $c$ is the concentration of the photo-sensitive substance in the sensitizing solution. If, for example, for o-methoxybenzenediazosulphonate log $\epsilon = 3.65$ for $\gamma = 3655$ A., i.e. $\epsilon = 4467$, $c$ must at least be 0.067 gm. eq./litre. If $\epsilon$ is only 1000, $c$ must be at least 0.3 gm. eq./litre.

In the following table the degrees of solubility in gm. eq./litre of some salts of substituted benzenediazosulphonic acids are given.

TABLE

|  | $NA^+$ | $Mg^{++}$ | $Al^{+++}$ | $Zn^{++}$ | $Ba^{++}$ |
|---|---|---|---|---|---|
| o-Methoxybenzenediazo- sulphonic acid | 0.17 | 1.4 | 2.0 | 1.9 |  |
| p-Methoxybenzenediazo- sulphonic acid | 0.40 | 1 |  |  | 0.2 |
| 5-chloro-2-methoxybenzene diazosulphonic acid | 0.20 | 1.2 |  | 1.9 |  |
| 2,5-dimethoxybenzene- diazosulphonic acid | 0.25 | 0.6 |  |  |  |
| 2,5-dimethoxy-4-acetyl- aminobenzenediazosulphonic acid |  | 1.25 |  |  |  |
| 2,5-diethoxy-4-chlorobenzene- diazosulphonic acid |  | >1.0 |  | 0.08 |  |
| 2,5-diethoxy-4-n-benzoyl- aminobenzenediazosulphonic acid | 0.08 | >0.6 |  |  |  |

For calculating the concentration of the sensitizing solution for manufacturing a hydrophilic layer of the thickness of the invention with an extinction per $\mu$ above the values given it is only necessary to apply the formula: $E = \epsilon.c.h'$, wherein $E =$ the total extinction of the layer and $h' =$ the thickness of the swollen layer $= (h + 0.01a)$ cm., wherein $\alpha =$ number of cubic cm. of water absorbed, $b$ the layer per 100 cm.$^2$ up to saturation. This formula is only an approximation. $h$ must be expressed in cm. in connection with the dimensions of the other magnitudes.

The thickness of the hydrophilic layer may be determined either by the overall quantity of substance applied per square cm. and rendered hydrophilic as a whole or by cutting, subsequent to hydrophilization, by means of a diamond at right angles to the layer, a scratch in the layer and by coloring the profile of the scratch by means of a coloring substance dissolved in water. According to a known method it is common practice to provide the cutting diamond with such a profile such that the profile of the out track is a factor 10 broader than the depth of cutting. Under the microscope the colored width of the track can be easily measured. In the case of the very small value of $1\mu$ for the thickness, the thickness is usually extrapolated from a hydrophilization curve as a function of time, higher values of which have been determined in the manner described above.

The invention will now be more fully described with reference to the following examples:

(1) In the manufacture of photo-resists for etching channel selector coils for use in television apparatus first a drawing on a scale of 10:1 is optically reduced by means of a graphic camera on a material having a high resolving power, for example "Kodak High Resolution Plate." By contact printing a slide is made therefrom and this slide serves for the manufacture by contact printing of the negatives serving for making collective positives. Finally, by contact copying, collective negatives are made from said collective positives, said negatives being used as photo-resists.

If a high-rate graphic film (Kodalith-Esterbase) is used for this purpose, the spread in the line width of the coils is about $5\mu$. If use is made of a material having a $6\mu$ hydrophilic layer, sensitized by means of 0.15 N of the sodium sulfite o-methoxy-benzenediazosulphonic acid-Na, no reproducible improvement could be obtained.

When using a material having a $2\mu$ layer, sensitized by means of 0.4 N of the sodium salt or p-methoxybenzenediazosulphonic acid-Na with an extinction per $\mu$ of 0.5, the image spread of the lines amounts to not more than $0.5\mu$.

(2) If fine copper mesh with a line width of about $6\mu$ with an interstice between the lines of about $36\mu$ has to be manufactured by electro-deposition of copper on an electrically conducting external image obtained by exposure of a pattern, by nucleus introduction and physical development of photo-sensitive material, it is found not to be possible to fulfill the requirement of transparency for the gauze, if a photo-sensitive material having a $6\mu$ layer is employed. Therein strong line spread and inadequate sharpness of the lines of the external silver image are involved. However, by the use of $2\mu$ material according to the invention, sensitized by 0.6 N of the magnesium salt of o-methoxybenzenediazosulphonic acid-Mg to an extinction per $\mu$ of 0.5, external silver images were obtained, which had a dimensional accuracy of about $0.5\mu$. When these silver images were coated with copper for the aforesaid use, in the electro-deposition, the gauze was produced with the desired degree of transparency.

(3) With the aid of a 8.5% by weight solution of "Gevaloid 1253 Flakes" in a mixture of 87 parts by volume of methylene-chloride and 13 parts by volume of ethanol a cellulose triacetate film was made. The dried film was superficially saponified in a solution of 65 gm./litre of KOH in methanol. After saponification the film was dipped for 15 seconds in a 1 mol methanol lactic acid solution, wiped off and dried in air. The film thus obtained was sensitized by impregnating it for two minutes in an aqueous solution of a photo-sensitive compound containing, in addition, 0.1 mol of cadmium lactate, 0.1 mol of calcium lactate and 0.1 mol of lactic acid (pH=4). Then the rear side of the film is washed with water and the film is dried. A film having a saponified depth of $0.5\mu$ and sensitized with the aid of 0.45 N of the Mg salt of o-methoxybenzenediazosulphonic acid to an extinction of 0.46 per $\mu$ was exposed behind a frequency raster ($\lambda = 3655$ A.) and after the disproportionation it is developed with a nucleus introduction bath containing 0.01 N mercurous nitrate and 0.001 N AgNO$_3$ at 20° C. for 2 minutes in a stabilized physical ferrous-ferric developer of the composition:

0.05 molar ferrous ammonium sulphate,
0.01 molar ferric nitrate,
0.01 molar citric acid
0.01 molar silver nitrate
0.02% by weight of "Armac 12 D" and
0.02% by weight of "Lissapol N"

to a $\gamma$ of 2.7. As a density value of 2.35 as well as with 1.5 the resolving power is found to exceed 1000 lines/mm.

A film having a saponified layer of $0.5\mu$, sensitized by 0.30 N of the Zn-salt of p-methoxybenzenediazosulphonic acid to an extinction per $\mu$ of 1, treated with the same nucleus introduction bath and intensified by the same developer to a $\gamma$ of 1.4 and to density value of 1.2, yielded a reproduction of the frequency range with a resolving power of more than 1000 lines/mm. The exposure therein was carried out without using a Wood's filter.

(4) The film manufactured as described in the preceding Example 3 was saponified to a depth of $1.5\mu$, sensitized with a solution of 0.32 N of the Mg salt of o-methoxy-benzenediazosulphonic acid-Mg to an extinction per $\mu$ of 0.5, was exposed in an identical manner but without Wood's filter. The exposed film was then treated with a nucleus introduction bath and a physical developer as described in the preceding example, and developed for one minute at 20° C. to a $\gamma$ of 1.9 and a density of 1.6. The resolving power of the reproduction amounted to 1000 lines/mm.

(5) A saponified layer having a thickness of $2\mu$ was sensitized with the aid of 0.45 N solution of aluminum salts of p-methoxybenzenediazosulphonic acid to an extinction per $\mu$ of 0.5. After exposure as in the previous example, it was treated with a nucleus introduction bath formed by aqueous solution of 0.01 N mercurous nitrate and 0.004 N AgNO$_3$ and developed with the aid of the physical developer of the preceding Example 3 at $\gamma$ of 3.5 to a density 1.6. Also in this case the image obtained has a resolving power of 1000 lines/mm.

(6) Photo-sensitive material having a hydrophilic layer of 1$\mu$ was sensitized with a solution of 0.15 N of the Na salts of o-methoxybenzenediazosulphonic acid to an extinction per $\mu$ of 0.3. After exposure behind a frequency raster the material was treated with a solution containing 0.01 N mercurous nitrate and 0.002 N AgNO$_3$; it was developed as described above to $\gamma = 1.4$ at 20° C. for one minute. As a density of 1.8 the resolving power obtained amounts to 800 lines/mm.

(7) Photo-sensitive material having a hydrophilic layer of 0.5, 2.5 and 6.25$\mu$ was sensitized with the Mg salt of o-methoxybenzenediazosulphonic acid to an extinction per $\mu$ of 0.30 and exposed to an ultraviolet lamp of 500 w. behind a line-frequency raster of 125 to 1000 lines/mm., the progression having the value of $$\sqrt[3]{2}$$

The exposure is carried out with and without a Wood's filter so that the intensity of the actinic light without Wood's filter is equal to that with the Wood's filter. After exposure the material was treated with a nucleus introduction bath and physically developed in the manner described above so that $\gamma$ is 1. With this low $\gamma$ value, the line spread is more pronounced than with a higher value of $\gamma$. The exposure times used were plotted in curves, the stated boundary of the resolution being plotted on the ordinate and the log $E$=density D being plotted on the abscissa. From the curves thus obtained it appeared that with the 0.5$\mu$ material no difference could be assessed between the exposures with and without the Wood's filter; with the 2.5$\mu$ material only a small difference could be observed at the low density values of about $D=0.6$, whereas with the 6.25$\mu$ material about 250 lines/mm. are found with $D=0.6$ without Wood's filter and about 500 lines/mm. with the Wood's filter. This difference is maintained practically throughout the density range until it becomes smaller at $D=1.8$. However, even with $D=2$ it is still clearly perceptible, although this is near the optimum density value chosen for the material of this test.

(8) A photo-sensitive material having a hydrophilic layer of 0.5$\mu$ and the same material having a layer of 6$\mu$, both sensitized with the Mg salt of o-methoxybenzenediazosulphonic acid-Mg to an extinction per $\mu$ of 0.5 were compared as regards their properties for optical reductions (1:40) of a frequency raster; use being made of a lens having a numerical aperture of 0.42 and of 500 w. high-pressure mercury vapor lamp provided with a Wood's filter. The nucleus introduction and the physical development were carried out as described above so that $\gamma$ was 1. The duration of development was one minute. By microscopic observation, the curves of resolutions against density were drawn. It was found that the optical image on the 6$\mu$ material did not attain more than about 800 lines/mm. (see the preceding example, in which with a lower extinction per $\mu$ the resolving power is 1000 lines/mm.). There appear great differences between the 0.5$\mu$ and the 6$\mu$ materials. Thus a density of 0.3 the thin material had a resolving power of 500 lines/mm. and as a density of 0.4 800 lines/mm., whereas the 6$\mu$ material at a density of 0.4 did not even attain a resolving power of 100 lines/mm. The curve for the thin material therefore tends much more towards lower density values and is, moreover, broader than the curve of the 6$\mu$ material; the resolving power amounts to more than 800 lines/mm. with density values between 0.4 and 1.0, whereas with the 6$\mu$ material this resolving power was a resolving power attained only between density values of 0.85 and 1.15, while 500 lines/mm. required a density of 0.7.

(9) A support provided with a hydrophilic layer of 0.5$\mu$, sensitized with 0.45 N of the Mg salt of o-methoxybenzenediazosulphonic acid-Mg to an extinction per $\mu$ of 0.46 was tested with respect to illegibility by means of a contact print of the frequency raster. For each frequency this raster consisted of a great number of octagonal test figures used in the AWV-microfilm test method 1960. Then the latent image was produced by treating the exposed film with an aqueous solution of 0.01 N mercurous nitrate and 0.001 N of AgNO$_3$. Then physical development was carried out to a $\gamma$ of 1 for one minute at 20° C. The curve obtained showed at $D=0.1$ the limit of 300 lines/mm.; 625 lines/mm. at $D=0.25$, 800 lines/mm. at $D=0.28$, 1000 lines/mm. at $D=0.4$ and a higher number at $D=1.6$, the number dropping to 800 lines/mm. at $D=1.8$.

(10) A support having a hydrophilic layer of 1.5$\mu$, sensitized with 0.32 N of the Mg-salt of o-methoxybenzenediazosulphonic acid to an extinction per $\mu$ of 0.5, and treated by contact copying as described above with a nucleus introduction bath containing 0.01 N mercurous nitrate and 0.002 N AgNO$_3$ and developed for one minute to $\gamma = 1.9$, yielding a curve. Thus this curve showed 200 lines/mm. at $D=0.2$, 400 lines/mm. at $D=0.4$, 800 lines/mm. at $D=0.7$ and at least 1000 lines/mm. at $D=0.4$, 800 lines/mm. at $D=0.7$ and at least 1000 lines/mm. between $D=1.0$ and 2.1.

(11) A support having a hydrophilic layer of 0.5$\mu$, sensitized with 0.30 N of the Zn salt of p-methoxybenzenediazosulphonic acid-Zn to an extinction per $\mu$ of 1 and treated after contact copying with a nucleus introduction bath containing 0.01 N mercurous nitrate and 0.001 N silver nitrate and developed to $\gamma = 1.4$ gave a boundary curve lying in between those of the two preceding examples: 200 lines/mm. at $D=0.1$, 400 lines/mm. at $D=0.25$, 800 lines/mm. at $D=0.56$ and 1000 lines/mm. at $D=0.7$.

From this example it will be apparent that the resolving power already at very low density values reaches a fairly high value when the extinction per $\mu$ is raised to at least 0.4.

While we have described our invention in connection with specific embodiments and applications, other modifications thereof will be readily apparent to those skilled in this art without departing from the spirit and scope of the invention as defined in the appended claims.

What we claim is:

1. A photosensitive material comprising a hydrophobic support and a hydrophilic layer on said support, said hydrophilic layer having a thickness of at least 0.5$\mu$ and at most 2$\mu$ and containing a photosensitive substituted benzenediazosulfonic acid compound or salts thereof capable, upon exposure to light, of producing a light reaction product which, in the presence of water and by disproportioning, releases mercury metal from a water soluble mercury compound and wherein the concentration of the photosensitive compound is sufficiently high to produce an extinction of at least 0.2 per $\mu$ at a wavelength of 3655 A.

2. The photosensitive material of claim 1, wherein the hydrophilic layer contains such a high concentration of the photosensitive compound that the extinction per $\mu$ at a wavelength of 3655 A. is at least 0.4.

3. The photosensitive material of claim 1 wherein the photosensitive compound is a salt of a substituted benzenediazosulphonic acid.

4. The photosensitive material of claim 3 wherein the photosensitive compound is selected from the group consisting of a magnesium salt, a zinc salt and an aluminum salt of a substituted benzenediazosulphonic acid.

(References on following page)

References Cited

UNITED STATES PATENTS

| | | | |
|---|---|---|---|
| 2,609,295 | 9/1952 | Alink et al. | 96—49 |
| 2,793,118 | 5/1957 | Sanders et al. | 96—75 X |
| 2,838,398 | 6/1958 | Dippel et al. | 96—49 |
| 2,854,338 | 9/1958 | Herrick et al. | 96—49 X |
| 2,868,643 | 1/1959 | De Jonge et al. | 96—48 |
| 2,929,709 | 3/1960 | Jonker et al. | 96—49 |
| 3,130,052 | 4/1964 | Dippel et al. | 96—49 |
| 3,202,510 | 8/1965 | Hollman | 96—75 |
| 3,219,448 | 11/1965 | Lu Valle et al. | 96—94 |
| 3,309,200 | 3/1967 | Berman et al. | 96—49 |

FOREIGN PATENTS

| | | |
|---|---|---|
| 677,772 | 8/1952 | Great Britain. |
| 690,212 | 4/1953 | Great Britain. |
| 690,476 | 4/1953 | Great Britain. |

OTHER REFERENCES

Alink et al., "The Metal-Diazonium System for Photographic Reproduction," Journal of the SMPTE, vol. 54, March 1950, pp. 355–358.

NORMAN G. TORCHIN, *Primary Examiner.*

C. L. BOWERS, JR., *Assistant Examiner.*

UNITED STATES PATENT OFFICE
CERTIFICATE OF CORRECTION

Patent No. 3,385,705                                      May 28, 1968

Cornelis Johannes Dippel et al.

It is certified that error appears in the above identified patent and that said Letters Patent are hereby corrected as shown below:

Column 3, line 69, after "6µ" insert -- layer --.

Signed and sealed this 13th day of January 1970.

(SEAL)
Attest:

Edward M. Fletcher, Jr.                      WILLIAM E. SCHUYLER, JR.
Attesting Officer                                     Commissioner of Patents